(12) United States Patent
Monson et al.

(10) Patent No.: US 10,719,161 B2
(45) Date of Patent: Jul. 21, 2020

(54) DYNAMIC SUSPENSION AND PASSIVE HAPTIC FEEDBACK FOR TOUCH SENSORS

(71) Applicant: Cirque Corporation, Salt Lake City, UT (US)

(72) Inventors: Brian Monson, Farmington, UT (US); Jared G. Bytheway, Sandy, UT (US); Richard D. Woolley, Orem, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 16/241,600

(22) Filed: Jan. 7, 2019

(65) Prior Publication Data

US 2019/0212861 A1 Jul. 11, 2019

Related U.S. Application Data

(60) Provisional application No. 62/614,115, filed on Jan. 5, 2018, provisional application No. 62/713,754, filed on Aug. 2, 2018.

(51) Int. Cl.
*G06F 3/041* (2006.01)
*G06F 3/044* (2006.01)
*G06F 3/0354* (2013.01)

(52) U.S. Cl.
CPC ............ *G06F 3/0414* (2013.01); *G06F 3/044* (2013.01); *G06F 3/0446* (2019.05); *G06F 3/04142* (2019.05); *G06F 3/03547* (2013.01); *G06F 2203/04106* (2013.01)

(58) Field of Classification Search
CPC .... G06F 3/0414; G06F 3/04142; G06F 3/044; G06F 3/0446; G06F 2203/04106; G06F 3/03547
See application file for complete search history.

(56) References Cited

U.S. PATENT DOCUMENTS

| | | | | |
|---|---|---|---|---|
| 2014/0002358 A1* | 1/2014 | Bruwer | ................... | G05G 9/047 345/158 |
| 2015/0009178 A1* | 1/2015 | Schneider | ............... | G06F 3/041 345/174 |
| 2016/0124511 A1* | 5/2016 | Takeshi | .................. | G06F 3/016 345/157 |

* cited by examiner

*Primary Examiner* — Nelson M Rosario

(57) ABSTRACT

Systems and methods for providing a touch sensor include a dynamic suspension system to enable the touch sensor to emulate the tactile sensation that a user feels when using pushbutton switches, wherein a touch sensor is combined with at least one snap dome and a post inside the snap dome to keep the touch sensor rigid until the touch sensor is allowed to be displaced when a force is applied, and then the post is retracted or released to enable movement of the touch sensor and the snap dome are disclosed. Also disclosed are systems and methods for a clickable touchpad that enables the clickable function to be selectively locked or unlocked in accordance with detected or sensed conditions are disclosed.

18 Claims, 7 Drawing Sheets

DYNAMIC SUSPENSION AND PASSIVE HAPTIC FEEDBACK FOR TOUCH SENSORS

CROSS-REFERENCE TO RELATED APPLICATIONS

This application, under 35 U.S.C. § 119, claims the benefit of U.S. Provisional Patent Application Ser. No. 62/614,115 filed on Jan. 5, 2018, and entitled "Dynamic Suspension On A Touch Sensor," and U.S. Provisional Patent Application Ser. No. 62/713,754 filed on Aug. 2, 2018, and entitled "Passive Haptic Feedback," the contents of both of which are hereby incorporated by reference herein.

FIELD OF THE DISCLOSURE

This disclosure relates generally to clickable touchpads. In particular, this disclosure relates to systems and methods for emulating the feel of pushbutton switches when using a touch sensor by providing a dynamic suspension system and for providing a clickable touchpad that enables the clickable function to be selectively locked or unlocked in accordance with detected or sensed conditions.

BACKGROUND

When using a touch sensor, a tactile button click may be an effective way to offer the user tactile feedback when a button press is performed. However, some existing systems enable a button click in all modes of operation, even when a button press operation is not available to the user.

Accordingly, it would be an advantage over existing systems to be able to modify a touch sensor to include a dynamic suspension system that enables the touch sensor to emulate the tactile sensation that a user feels when using pushbutton switches. It would be a further advantage if a tactile button click was not available to the user when a button click cannot actually be performed.

Furthermore, including haptic feedback in large touchpad, such as a palm rest sized touchpad, is problematic. For example, haptic actuators are typically relatively large in size, consume a large amount of available power, and are expensive. Further, a large, palm rest sized touchpad with haptic feedback requires several haptic actuators adding to the cost and complications.

Additionally, haptic actuators are relatively thick in profile making a thin touchpad, among other things, problematic to design and manufacture.

Further, a large, palm rest sized clickable touchpad can involve structural issues for the device in which it is placed. For example, putting a large enough hole into a device housing (e.g., a laptop computer) to accommodate a movable palm rest sized touchpad can impact the structural integrity of the housing.

Typically, current click pads, or clickable touchpads, use a hinged or otherwise movable touchpad with a snap dome, a metal dome tactile switch, or the like, underneath the touchpad that "clicks" when the touchpad is pressed. Current force pads, typically, do not move when pressed, but use force sensors to detect the amount of pressing on the touchpad, and some variants use a haptic actuator (e.g., a vibrator) to give haptic feedback upon touch.

Other drawbacks, disadvantages, issues, and complications with current systems and methods also exist.

SUMMARY

Accordingly, disclosed embodiments address the above, and other drawbacks, disadvantages, issues, and complications with current systems and methods.

Figure 1:
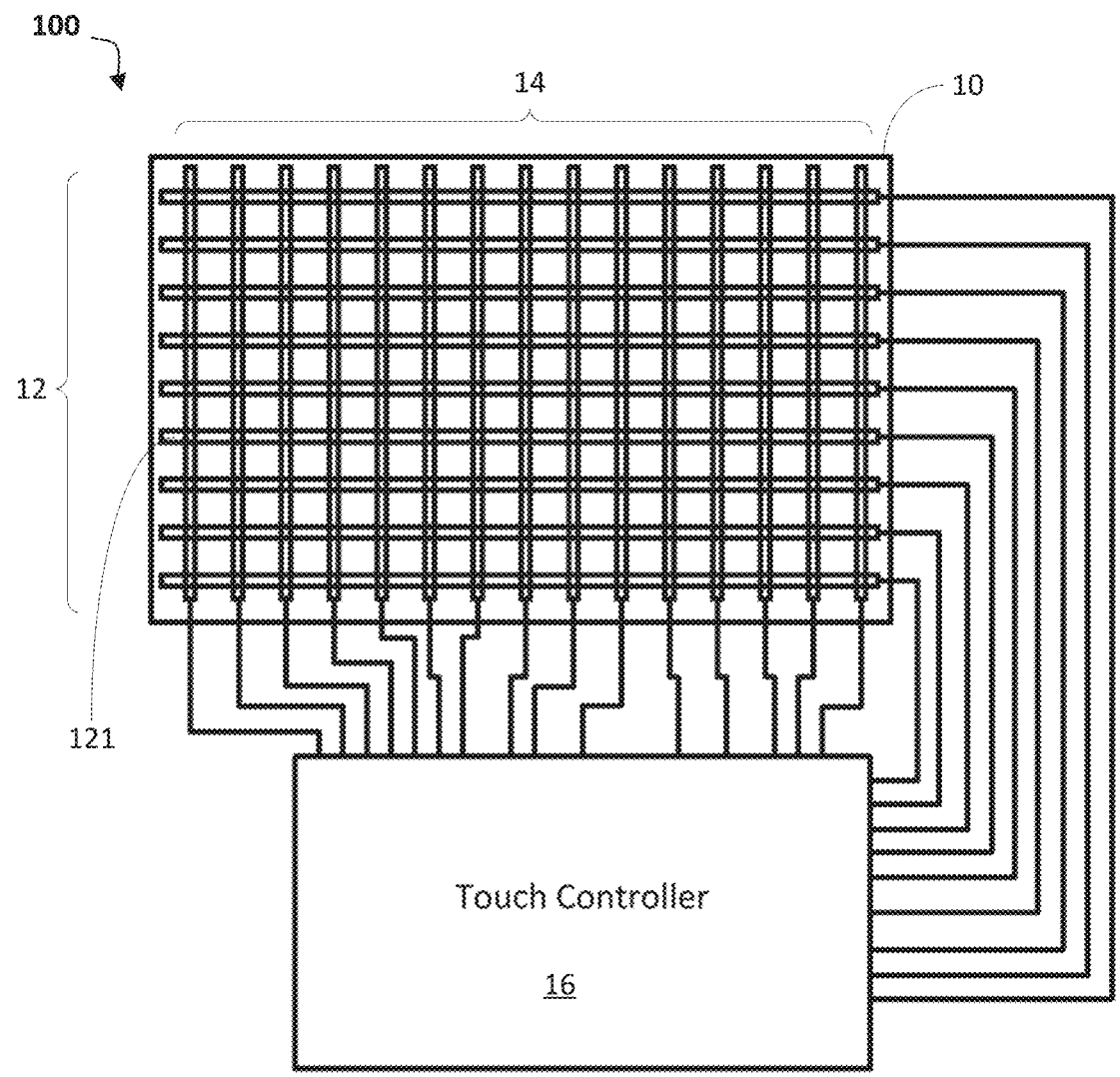
FIG. 1 is a schematic block diagram of an example of a capacitive touchpad system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should be understood that use of the term "touch sensor" throughout this document may be used interchangeably with "capacitive touch sensor," "capacitive sensor," "capacitive touch and proximity sensor," "proximity sensor," "touch and proximity sensor," "touch panel," "touchpad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

The present invention utilizes touchpad technology from CIRQUE® Corporation. Accordingly, it is useful to understand operation of the touchpad technology to a degree. The touchpad technology from CIRQUE® Corporation is a mutual capacitance sensing device 100 and an example is illustrated in FIG. 1. For this device 100 a touchpad 10 having a grid of row 12 and column 14 electrodes is used to define the touch-sensitive area of the touchpad 10. Typically, the touchpad is configured as a rectangular grid of an appropriate number of electrodes (e.g., 8-by-6, 16-by-12, 9-by-15, or the like).

As shown in FIG. 1, the mutual capacitance sensing device 100 also includes a touch controller 16. Touch controller 16 typically includes at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

Typically, touch controller 16 also includes at least one multiplexing circuit to alternate which of the row 12 or column 14 electrodes are operating as a drive electrode or a sense electrode. The driving electrodes can be driven one at a time in sequence, or randomly, or all at the same time in encoded patterns. Other configurations are possible such as self capacitance mode where the electrodes are driven and sensed simultaneously. Electrodes may also be arranged in non-rectangular arrays, such as radial patterns, linear strings, or the like. Other configurations are also possible.

Typically, no fixed reference point is used for measurements. Touch controller 16 generates signals that are sent directly to the row 12 and column 14 electrodes in various patterns.

The touchpad 10 does not depend upon an absolute capacitive measurement to determine the location of a finger (or stylus, pointer, or other object) on the touchpad 10 surface. The touchpad 10 measures an imbalance in electrical charge to the electrode functioning as a sense electrode (exemplarily illustrated as row electrode 121 in FIG. 1, but can be any of the row 12, column 14, or other dedicated-sense electrodes). When no pointing object is on or near the touchpad 10, the touch controller 16 is in a balanced state, and there is no signal on the sense electrode (e.g., electrode 121). When a finger or other pointing object creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14.

It should also be understood that touchpad technology is only one type of technology usable with the present disclosure. Accordingly, the presently disclosed embodiments may be implemented for electromagnetic, inductive, pressure sensing, electrostatic, ultrasonic, optical, resistive membrane, semi-conductive membrane, or other finger or stylus-responsive technology.

Disclosed embodiments are directed to a touch sensor that may be capable of movement, but only when desired. Thus, the touch sensor must be capable of being held rigid when no tactile feedback is needed, and capable of movement in a specific manner when tactile feedback is desired.

Figure 2:
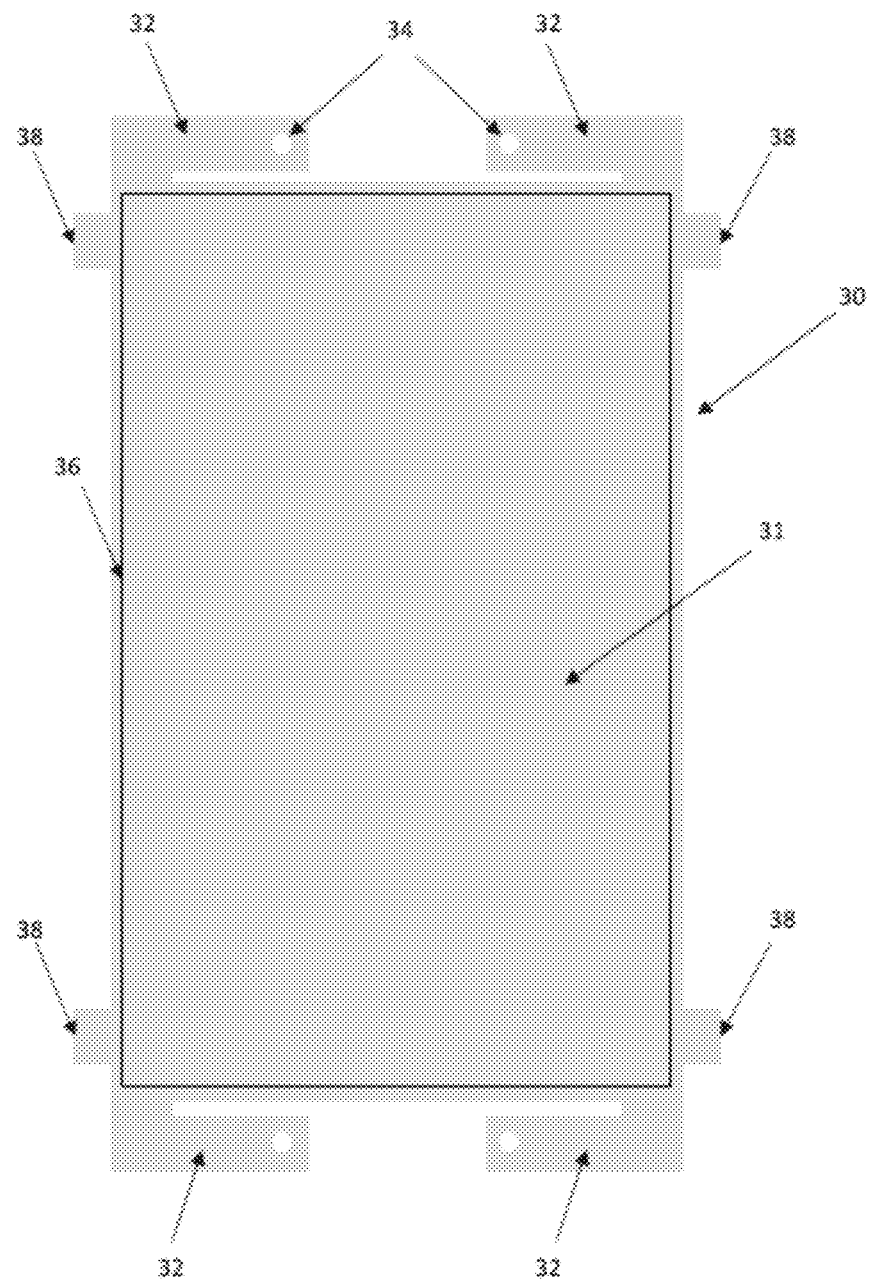
FIG. 2 is an illustration of a top view of a substrate and touch sensor disposed thereon, the substrate having four flex arms on each corner of the touch sensor.

Accordingly, FIG. 2 is an illustration of a top view of a substrate 31 and touch sensor 30 disposed thereon, the substrate 31 having four flex arms 32 on each corner of the touch sensor 30. The touch sensor 30 has several features that enable it to provide the desired movement characteristics. A first feature of the touch sensor 30 is a substrate 31. The substrate 31 may have four flex arms 32 that may suspend the touch sensor within a housing (not shown in FIG. 2). The substrate 31 of the touch sensor 30 may be manufactured from a single sheet of flexible material as shown in this first embodiment. For example, the substrate 31 may be comprised of printed circuit board (PCB). The PCB may be sufficiently flexible to enable the four flex arms 32 to provide the desired mechanical deflection action of the touch sensor 30.

As shown, embodiments of the four flex arms 32 are shown with a hole 34 at the distal end of each one. The hole 34 in each flex arm 32 may be used to position and hold the touch sensor 30 in place within a housing. Applying a force to any portion of the touch surface 36 of the touch sensor 30 may result in the flexing of the four flex arms 32 where the flex arms 32 are attached to the corners of the touch sensor.

In other embodiments, the four flex arms 32 may not be an integral part of the substrate 31 of the touch sensor 30, but are instead mechanically joined to a touch sensor 30 and may still provide the flexibility needed for the touch sensor 30 to be mechanically manipulated by a force applied to the touch surface 36.

The length of each of the four flex arms 32 may be the same or they may vary. The four flex arms 32 may vary in width and length from that shown in FIG. 2. The four flex arms 32 may or may not have the holes 34 for positioning. The touch sensor 30 shown in FIG. 2 is for illustration purposes only, and the length and width of any part of the touch sensor may be varied as would be understood by a person of ordinary skill having the benefit of this disclosure.

As also shown in FIG. 2, the touch sensor 30 may also include four small tabs 38 or other mechanical stops. While the four flex arms 32 may be disposed on the short sides of the touch sensor 30, the tabs 38 may be disposed on the long sides of the touch sensor. The tabs 38 may function to prevent undesired movement of the touch sensor 30. For example, the four tabs 38 may be pivot points that may prevent the touch sensor 30 from lifting out of a housing and to instead assist the touch sensor 30 in moving downward into the housing when a force is applied to the touch surface 36.

The position of the four tabs 38 along the long sides may be changed in order to obtain a different depth of movement of the touch sensor 30 when a force is applied to the touch surface 36, or they may be eliminated completely. Accordingly, the position of the four tabs 38 along the long sides may be changed in order to achieve different movement characteristics of the touch sensor 30 when a force is applied. Likewise, while four tabs 38 are shown in FIG. 2 more or less may be used, and other shapes for tabs 38 may be used as would be understood by a person of ordinary skill having the benefit of this disclosure.

Figure 3A:
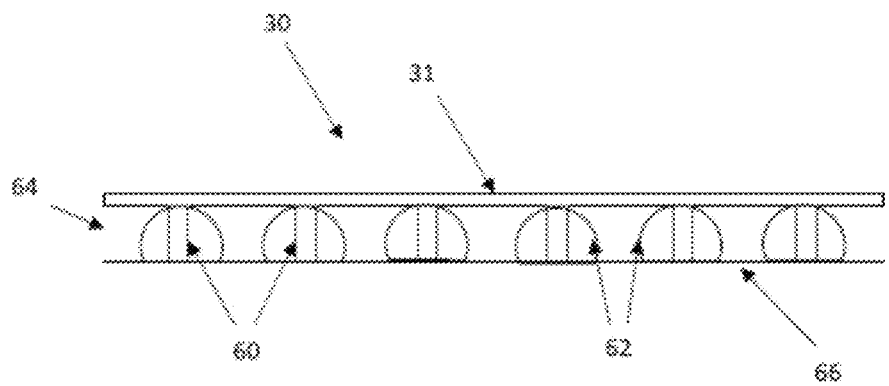
FIG. 3A is a cross-sectional profile view of an embodiment that includes a plurality of snap dome switches and a plurality of posts for keeping the snap domes switches from being used until the plurality of posts are withdrawn or released.
Figure 3B:
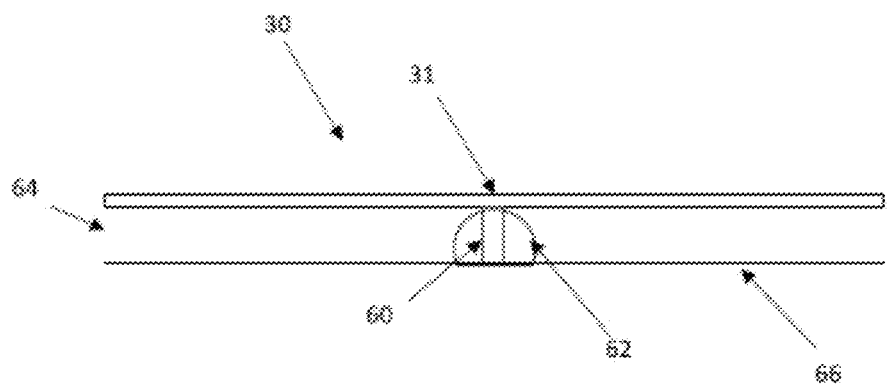
FIG. 3B is a cross-sectional profile view of another embodiment that includes a single snap dome switch and a single post for keeping the snap dome switch from being used until the post is withdrawn or released.

FIG. 3A is a cross-sectional profile view of an embodiment that includes a plurality of snap dome switches 62 and a plurality of posts 60 for keeping the snap domes switches 62 from being used until the plurality of posts 60 are withdrawn or released, and FIG. 3B is a cross-sectional profile view of another embodiment that includes a single snap dome switch 62 and a single post 60 for keeping the snap dome switch 62 from being used until the post is withdrawn or released.

As shown in both FIGS. 3A and 3B, each snap dome switch 62 may include a post 60 disposed inside each of the snap dome switches 62 and underneath the substrate 31. FIGS. 3A-3B are not necessarily shown to scale and are shown for the purposes of illustrating the concept of one or more snap dome switches 62 and posts 60 being disposed underneath the touch sensor 30. A plurality of snap domes 62 and posts 60 may enable some portions of the touch sensor 30 to move while other portions may be kept rigid.

The plurality of posts 60 may be retracted or just released and allowed to move into a bottom of the housing 66 so that the touch sensor 30 may remain stationary over an open space 64 underneath the touch sensor and resting on the snap domes 62. The plurality of posts 60 may be retracted or released so that that the snap domes 62 may move in response to action of the user or other context specific action occurs.

Applying a downward force on the touch sensor 30 when the plurality of posts 60 are retracted may enable the touch sensor 30 to give tactile feedback as if it were a large pushbutton or a forcepad. The touch sensor 30 may travel a distance allowed by the snap dome switches 62 and by the flexing of the four flex arms 32 of the touch sensor 30. Releasing a force on the touch sensor 30 may allow the snap domes 62 to pop back into place and return the touch sensor 30 to a rest position where no force is being applied.

The displacement of the touch sensor 30 may be rapid when a snap dome switch 62 is pressed, or it may be more gradual in order to allow the touch sensor 30 to move more precisely between a range of displacements.

It should also be understood by persons of ordinary skill having the benefit of this disclosure that the snap dome switches 62 may provide an audible clicking sound like a pushbutton, or it may be silent.

It should also be understood that the snap dome 62 with a post 60 inside it is only one disclosed embodiment and there may be other ways to enable a touch sensor 30 to be held in place in a rigid manner, and then enabled to be displaced by application of a force. Other embodiments may also include various ways to provide tactile feedback to a user other than just the movement of the touch sensor 30. Accordingly, a haptics engine may also be provided. The haptics engine may or may not be part of the touch sensor 30.

There may be many different actions that may cause some or all of the plurality of posts 60 to be retracted and thus allow movement of the touch sensor 30 and the actions may vary depending on the host device (e.g., laptop, smartphone, etc.), the host device software (e.g., applications and operating systems, etc.), and the like. These actions may include but should not be considered as limited to: movement of a cursor over a portion of a display that includes a virtual button, movement of a finger over a particular portion of touch sensor 30, or movement of a finger over a particular location on a touchscreen.

In more general terms, some embodiments may be directed to systems and methods for an active suspension system for the touch sensor 30, and context specific enablement of the active suspension system. In other words, the touch sensor 30 may be prevented from moving when a force is applied if a finger is not at a location where movement should be allowed.

For example, consider a touchpad or a touchscreen. A user's finger may be over an ENTER button on a display. If the user applies a force to the ENTER button, it may be allowed to feel movement of the touch sensor. However, if the finger is not over a virtual button, then movement of the touch sensor 30 may be prevented. In some embodiments, movement may be prevented using posts 60.

Different criteria may be used for determining the context specific enablement of movement. For example, the context may be selected from the location of a finger on the touch sensor 30, the location of the cursor on a display, or the amount of force that is being applied to the touch sensor 30. Any of these contexts may provide different criteria for allowing movement of the touch sensor 30.

Other embodiments may enable other applications of the active suspension system. For example, an active suspension system as disclosed herein may be used in a system with force sensing in order to provide a forcepad. Other embodiments are also possible as would be understood by persons of ordinary skill having the benefit of this disclosure.

Figure 4:
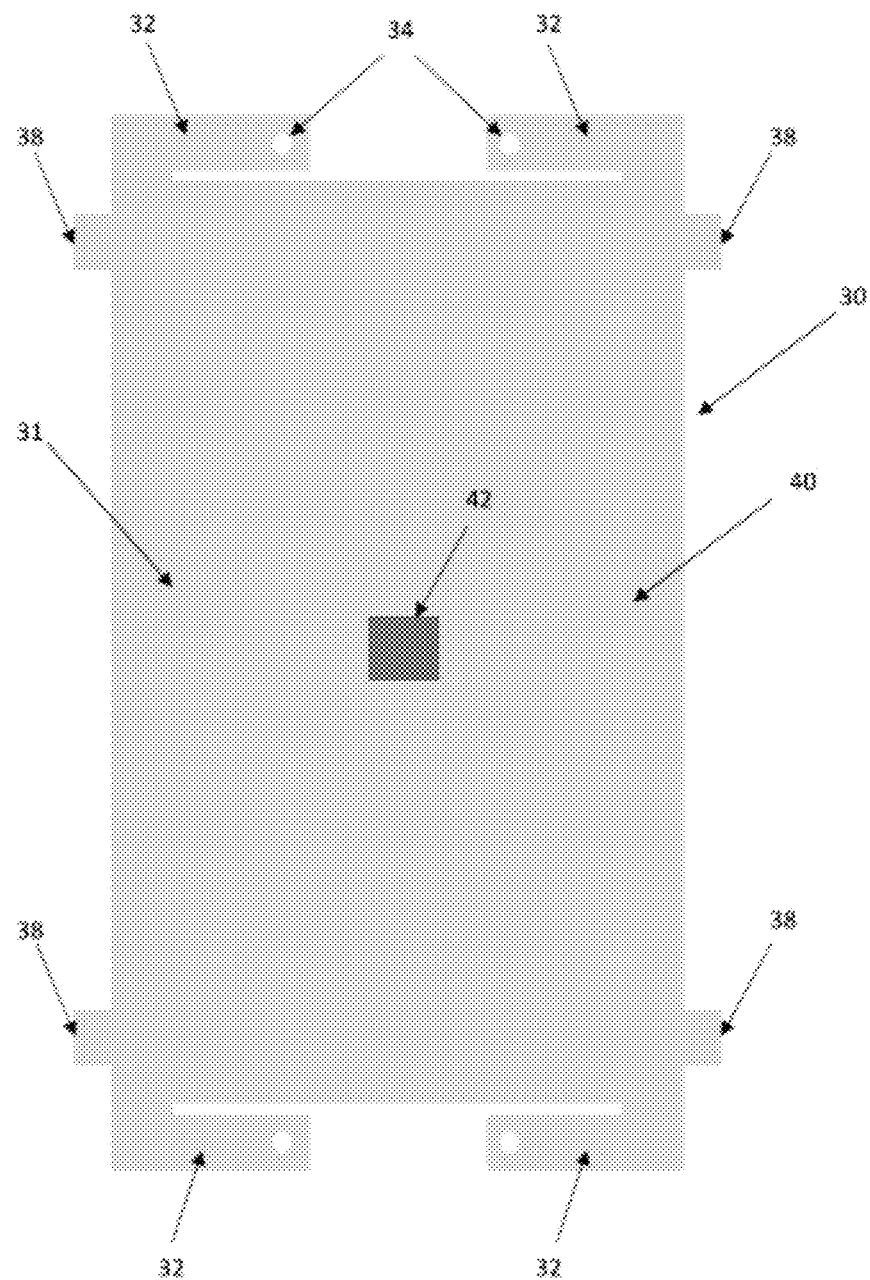
FIG. 4 is a top-down view of the bottom of a touch sensor substrate showing a mechanical switch disposed in the center of the substrate to provide a mechanical switch when the touch sensor is pressed.

FIG. 4 is a top-down view of the bottom side 40 of a touch sensor 30 substrate 31 showing a mechanical switch 42 disposed on the substrate 31 to provide a mechanical switch when the touch sensor 30 is pressed. The bottom side 40 shows a mechanical switch 42 that may be disposed in a center, or other locations, of the touch sensor 30. The mechanical switch 42 may provide a mechanical click when pressed and/or released. The mechanical click may be a haptic movement, a clicking sound, or both. The mechanical click may be caused by the mechanical switch 42 making contact with touch sensor 30.

Figure 5:
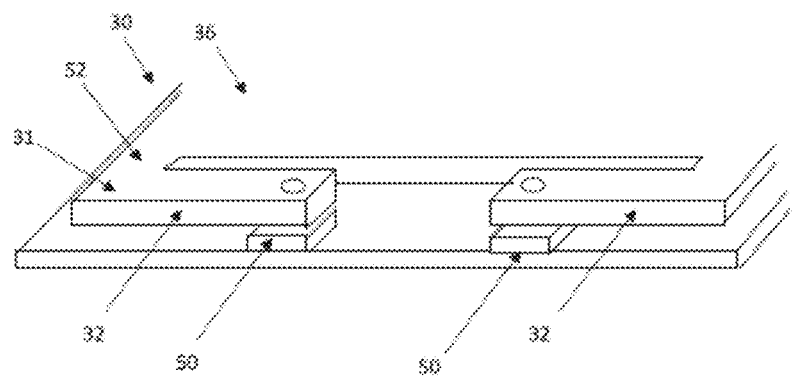
FIG. 5 is a partial perspective view from an edge of the touch sensor showing a portion of the substrate is supported by support structures at a distal end of each of the flex arms.

FIG. 5 is a partial perspective view from an edge of the touch sensor 30 showing a portion of the substrate 31 is supported by the support structures 50 at a distal end of each of the flex arms 32. The supporting structures 50 may be part of a housing (e.g., housing 66). The substrate 31 of the touch sensor 30 is shown as being supported by the flex arms 32. The flex arms 32 may be the only part of the touch sensor 30 to be in contact with the housing (through support structures 50). When a force is applied to the touch surface 36 of the touch sensor 30 and the posts 60 are released or retracted, the touch sensor 30 may travel downward towards the housing (e.g., housing 66) while supported by the four flex arms 32 until the switch 42 (e.g., as shown in FIG. 4) on the bottom of the touch sensor 30 makes contact with the bottom of the housing 66.

One aspect of the some embodiments is that a force may be applied at any location on the touch surface 36 and may still cause the entire touch sensor 30 to move toward the housing 66. However, the touch sensor 30 may be tilted if the force is being applied near an edge of the touch sensor 30 so that some areas of the touch sensor 30 move further towards the housing 66 than other portions of the touch sensor 30. Nevertheless, all of the touch surface 36 may move down toward the housing 66 as the force is applied. Movement may continue until the force is removed or until the switch 42 makes contact with the housing 66, preventing further movement of the touch sensor 30.

It is an aspect of the touch sensor 30 that the material used for the touch sensor 30 (e.g., substrate 31) will be flexible enough so that the touch sensor 30 may return to an unflexed or rest position when the force is not being applied.

One advantage of some embodiments, and the use of four flex arms 32 with one flex arm connected to the touch sensor 30 at each corner, is that the stress on the touch sensor 30 at the joint 52 between the touch sensor 30 and the four flex arms 32 may be more evenly distributed across the touch sensor 30. Thus, it may be easier to cause the mechanical movement of the touch sensor 30. However, it may be undesirable to have the touch surface 36 flex when a force is applied to perform a mouse click function. One advantage of some embodiments is that a material used to prevent flexing of the touch surface 36 may not have to be as rigid as when using only two flex arms 32 when a hinge structure is being used on the touch sensor 30 because the touch sensor 30 will move more easily with four flex arms 32. Alternatively, a thickness of the material used to prevent flexing of the touch sensor 30 may not have to be as thick and thereby increasing sensitivity of the touch sensor 30.

Another aspect of some embodiments is that a haptics feedback motor may be used to provide additional movement of the touch sensor 30. The additional movement of the touch sensor 30 may be a function of the amount of force or pressure that is applied to the touch sensor 30. The haptics feedback motor may therefore provide an additional degree of movement of the touch sensor 30.

Another aspect of some embodiments may be a mechanical spring bias feature. A spring mounting platform may be provided having a ramped surface and an opposing feature that bends the spring to form a preloaded condition. The touch sensor may be pushed against an inside bezel surface when the touch sensor is at a rest position when no force is being applied.

It is noted that integrating mechanical force sensing elements into the PCB of a capacitive touch sensor design may add redundant tracking capability. The first embodiment may be used to compare two independent sets of tracking data to isolate noise sources present in one measurement system by means of using a second measurement tracking system and a method to concurrently correlate data between the two measurement systems, thus improving accuracy of the touch sensor.

Integrated force sensing features may be capacitive, resistive, magnetic or inductive in nature. These sensors may also be discrete components soldered to or attached mechanically to the surface of a PCB or housing.

The advantages of the system include PCB tabs or lever features that may include integrated capacitive sensing components designed into the touch sensor PCB solution. Evaluating data from multiple sensing component features may result in positional measurements being derived and correlated with a traditional capacitive tracking system. The additional redundant positional tracking system may allow noise, errors or other inaccurate data to be resolved by comparison between both sensing systems.

By reusing existing component analog and digital signals designed within the touch sensor, it may be possible to provide multiple redundant tracking system technologies. Data may be correlated and resolved between both systems, thus improving object tracking and position accuracy. An additional benefit may be the ability to measure touchdown force.

Another advantage may be that a force tracking method may eliminate water droplet interference issues associated with capacitive only tracking solutions.

It is noted that the first embodiment shows a rectangular substrate 31 for the touch sensor 30. However, the shape of the substrate 31 may be different. For example, the shape of the substrate may include circular, triangular, or any other shape that enables a touch sensor to be disposed thereon and which allows the touch sensor to flex on flex arms. Accordingly, the number of flex arms may also be different than four. The number of flex arms may vary and be as few as two and have as many flex arms as needed to allow movement of the touch sensor when a force is applied.

Figure 6:
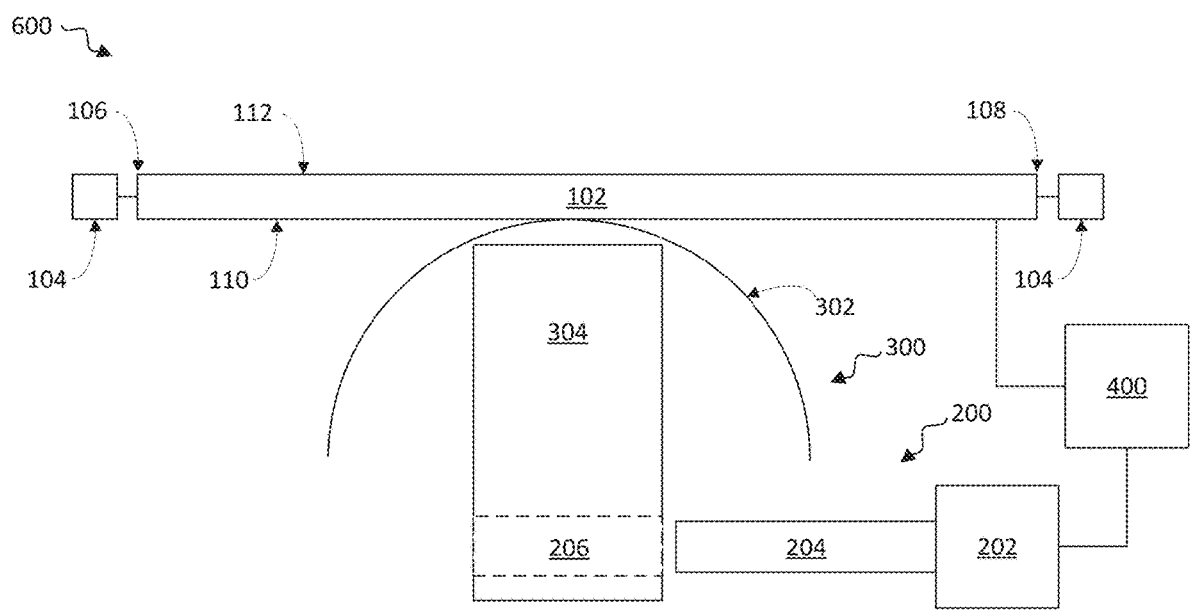
FIG. 6 is a schematic representation of a system for a clickable touchpad with a mechanical lockout in accordance with disclosed embodiments.

FIG. 6 is a schematic representation of a system 600 for a clickable touchpad 102 with a mechanical lockout system 200 in accordance with disclosed embodiments. As shown, system 600 includes a touchpad 102 that may be hinged 104, or otherwise moveable, at one or more edges 106, 108.

Bottom surface 110 of touchpad 102 is in contact with a clicking element 300 which may comprise a snap dome (e.g., snap dome switch 62), metal dome tactile switch, button, or the like. As shown schematically, clicking element 300 may further comprise a deformable dome 302 and a biasing member 304, such as a spring, spring mounted post, a resilient member, a flexible member, or the like, to return dome 302 to its undeformed position.

Disclosed embodiments also include a mechanical lockout system 200 which may further comprise a drive 202, a latch 204, and a catch 206. Drive 202 may comprise a motor, linear actuator, electromagnetic actuator, a coil, a magnet, a transducer, a spring, or the like. Drive 202 moves the latch 204 to engage or disengage the catch 206 as described herein.

As shown schematically in FIG. 6, latch 204 may comprise a post (e.g, post 60) a rod, a bar, a hook, a pawl, a gear, or any suitable device to engage catch 206. Likewise, catch 206 may comprise a hole, a rod, a hook, an eye, a gear, or the like. As one of ordinary skill in the art would comprehend having the benefit of this disclosure, the positions and functions of latch 204 and catch 206 may be reversed. As shown in FIG. 6 latch 204 is disengaged from catch 206 and movement of clicking element 300 and touchpad 102 is allowed.

As also indicated schematically, system 600 may also include a controller 400. Embodiments of controller 400 include appropriate circuitry, processors, software, firmware, or the like, to control mechanical lockout system 200 as disclosed herein. Embodiments of controller 400 also communicate with touchpad 102 to trigger control signals to mechanical lockout system 200. For example, when a large area touch (e.g., a palm, or portion thereof resting on touchpad 102) is sensed on a top side 112 of touchpad 102, controller 400 may trigger mechanical lockout system 200 to lock the clicking element 300 (e.g., power drive 202 to move latch 204 to engage catch 206) and prevent movement of the clicking element 300 and, consequently, the touchpad 102. In further example, when touchpad 102 senses a small area touch (e.g., a fingertip or stylus) controller 400 may trigger mechanical lockout system 200 to unlock the clicking element 300 (e.g., power drive 202 to move latch 204 to disengage catch 206) and allow movement of the clicking element 300 and, consequently, the touchpad 102 (e.g., allow a click).

As one of ordinary skill in the art would comprehend having the benefit of this disclosure, other sensed conditions may trigger the locking/unlocking of the motion or clicking of the touchpad 102. For example, a "swipe," or sensed motion along a continuous length of touchpad 102, may cause controller 400 to lock or unlock the mechanical lockout system 200 as desired. Similarly, for embodiments of touchpad 102 that include force sensors, controller 400 may unlock the mechanical lockout system 200 to enable a click when a threshold force level is sensed. Likewise, sensed touches at particular locations of the touchpad 102

(e.g., the corners, edges, or center) may cause controller 400 to lock or unlock the mechanical lockout system 200 as desired. Other configurations, trigger events, and control responses are also possible.

Figure 7:
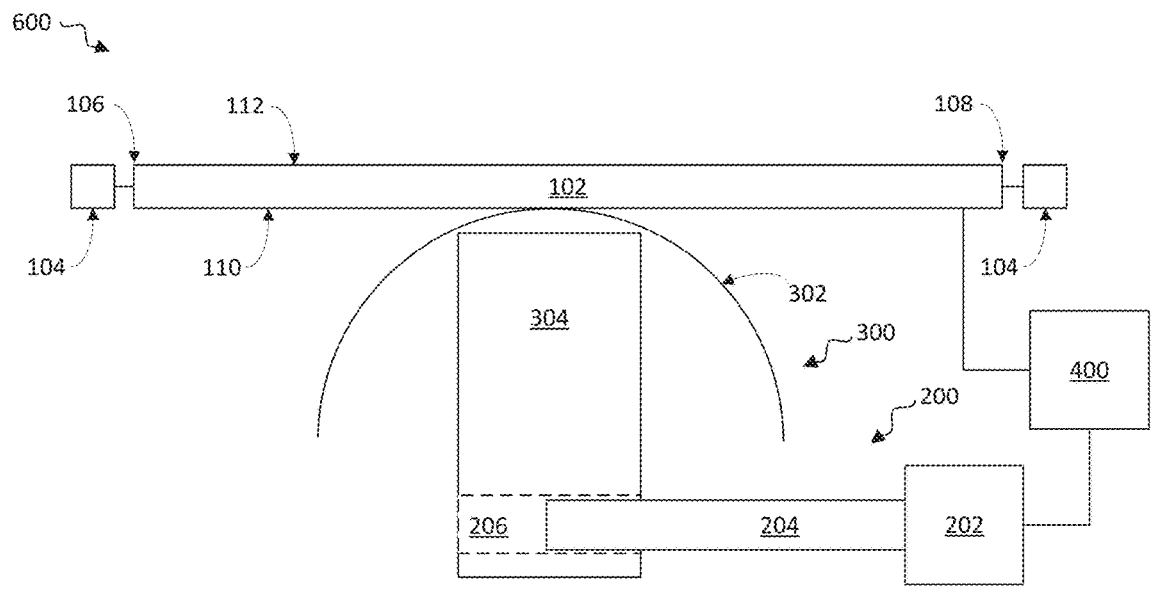
FIG. 7 is a schematic representation of the FIG. 1 system for a clickable touchpad with a mechanical lockout system engaged to lock touchpad motion in accordance with disclosed embodiments.

FIG. 7 is a schematic representation of the FIG. 6 system 600 for a clickable touchpad 102 with a mechanical lockout system 200 engaged to lock touchpad 102 motion in accordance with disclosed embodiments. As shown in FIG. 7 latch 204 is engaged with catch 206 and movement of clicking element 300 and touchpad 102 is prevented.

Figure 8:
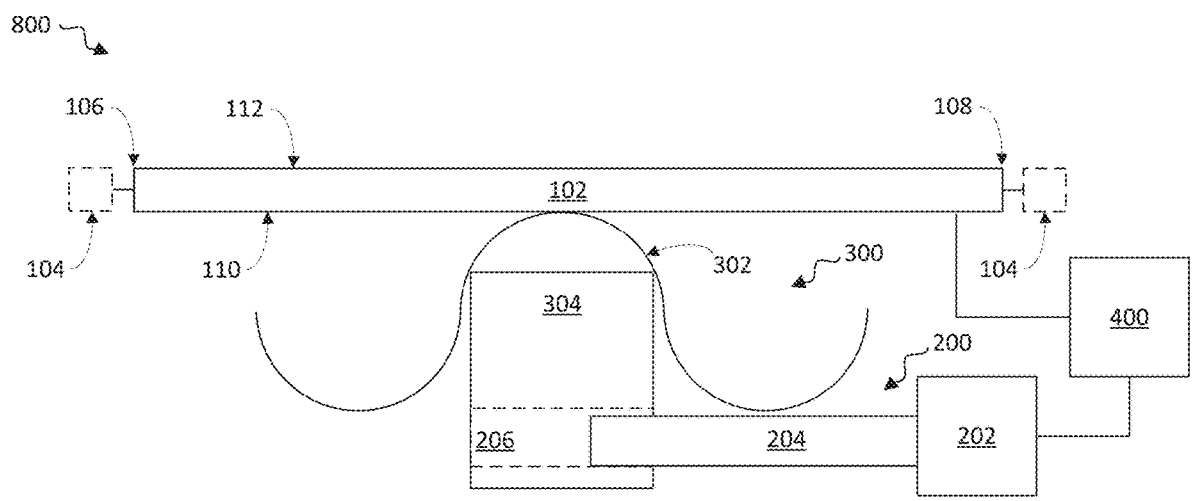
FIG. 8 is a schematic representation of another system for a clickable touchpad with a mechanical lockout system in accordance with disclosed embodiments.

FIG. 8 is a schematic representation of another system 800 for a clickable touchpad 102 with a mechanical lockout system 200 in accordance with disclosed embodiments. As shown schematically in FIG. 8, embodiments of system 800 may include a clicking element 300 that has been inverted and held with dome 302 in a snapped or deformed position and biasing member 304 compressed, or otherwise under tension against the deformation. In these embodiments, when conditions are sensed to trigger a haptic response (e.g., a finger press), controller 400 signals drive 202 to disengage latch 204 and catch 206 to allow biasing member 304 to move dome 302 and consequently touchpad 102 so that the user experiences a click, snap, or other haptic feedback. The system 800 may be reset with dome 302 back in a deformed position.

In another embodiment of the system 800 shown in FIG. 8, the touchpad 102 may be fixed in place with the hinges 104 removed (indicated by the dashed lines). When conditions are sensed to trigger a haptic response (e.g., a finger press), or for embodiments with force sensing an over-threshold force, the mechanical lockout system 200 may be triggered to cause clicking element 300 to snap and have the user experience the haptic feedback (i.e., the snap) even though the touchpad 102 does not appreciably move. As one of ordinary skill in the art would comprehend having the benefit of this disclosure, other configurations are also possible.

Figure 9:
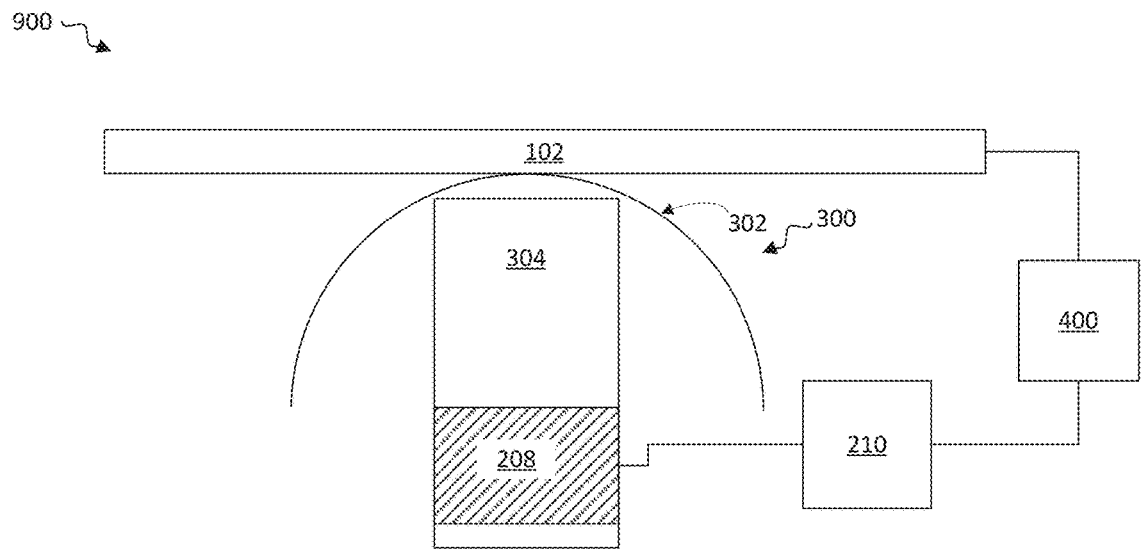
FIG. 9 is a schematic illustration of another system for a clickable touchpad in accordance with disclosed embodiments.

FIG. 9 is a schematic illustration of another system 900 for a clickable touchpad 102 in accordance with disclosed embodiments. In these embodiments, all or a portion of biasing member 304 may include a pliable or otherwise resilient region 208 that deforms without allowing clicking element 300 to snap or deform up to a threshold force or deformation level. Embodiments of system 900 may also include a lockout controller 210 which may be a part of controller 400, or a separate device, and includes appropriate circuitry, processors, software, firmware, or the like, to control any motion or haptic feedback for touchpad 102 as disclosed herein. For example, embodiments of resilient region 208 that include force sensors could be used to measure force applied to touchpad 102 irrespective of whether clicking element 300 is snapped or not. In further example, resilient region 208 may be a piezoelectric or similar material and lockout controller 210 may control snapping of clicking element 300 or other haptic feedback in accordance with sensed touches, gestures, or other trigger conditions as disclosed herein.

Figure 10:
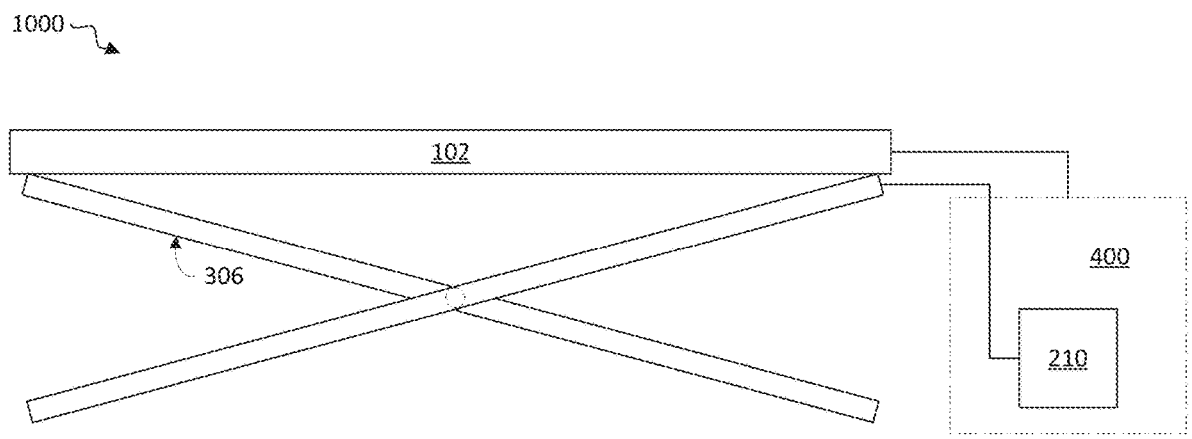
FIG. 10 is a schematic illustration of another system for a clickable touchpad in accordance with disclosed embodiments.

FIG. 10 is a schematic illustration of another system 1000 for a clickable touchpad 102 in accordance with disclosed embodiments. In these embodiments, a scissor mount 306, or other selectively movable device, is used to enable/disable motion of touchpad 202 as disclosed herein. For example, lockout controller 210, which is illustrated as a component of an optional system controller 400, may enable scissor mount 306 to move when certain touches, gestures, or the like are sensed and may lock to prevent touchpad 202 motion at other times. As one of ordinary skill in the art would comprehend having the benefit of this disclosure, other configurations are also possible.

Although various embodiments have been shown and described, the present disclosure is not so limited and will be understood to include all such modifications and variations are would be apparent to one skilled in the art.

What is claimed is:

1. A touch sensor system comprising:
   a substrate comprising a touch surface, a bottom side, and at least one flex arm;
   a snap dome switch in contact with the bottom side of the substrate; and
   a post selectively movable within the snap dome switch to inhibit or allow movement of the snap dome switch;
   wherein the post keeps the snap dome switch from being used until the post is withdrawn.

2. The touch sensor system of claim 1 further comprising:
   a housing that encloses at least a portion of the substrate; and
   a support structure within the housing that supports the substrate by contacting the at least one flex arm.

3. The touch sensor system of claim 2 further comprising:
   a distal end of the at least one flex arm and wherein the distal end of the at least one flex arm contacts the support structure.

4. A clickable touchpad system comprising:
   a touchpad having a top side and a bottom side;
   a mechanical lockout system;
   a clicking element located proximate to the bottom side of the touchpad and configured to operate with the mechanical lockout system to selectively allow movement of the clicking element upon application of a force to the top side of the touchpad; and
   a controller in communication with at least the mechanical lockout system to control the selectively allowable movement of the clicking element;
   wherein the mechanical lockout system includes a latch and a snap dome switch;
   wherein the latch keeps the snap dome switch from being used until the post is withdrawn.

5. The clickable touchpad system of claim 4 wherein the mechanical lockout system further comprises:
   a drive, in communication with the controller, and configured to impart motion to the latch to engage a catch upon transmission of a signal from the controller.

6. The clickable touchpad system of claim 4 further comprising:
   at least one edge on the touchpad; and
   a hinge located at the at least one edge on the touchpad and configured to enable the touchpad to move.

7. The clickable touchpad system of claim 4 wherein the clicking element further comprises:
   a deformable dome; and
   a biasing member.

8. The clickable touchpad system of claim 7 wherein the deformable dome is held by the mechanical lockout system in a deformed position with the biasing member under tension against the deformation until the controller signals the mechanical lockout system to release the deformable dome.

9. The clickable touchpad system of claim 7 wherein the biasing member further comprises a resilient region.

10. The clickable touchpad system of claim 9 wherein the resilient region comprises a piezoelectric material.

11. A touch sensor system, comprising:
    a substrate of a touch sensor comprising a touch surface and a bottom side;

a snap dome switch in contact with the bottom side of the substrate; and a post selectively movable within the snap dome switch to inhibit or allow movement of the snap dome switch;

wherein the post keeps the snap dome switch from being used until the post is withdrawn.

12. The system of claim 11, wherein the snap dome is part of a plurality of snap dome switches in contact with the bottom side of the substrate.

13. The system of claim 12, wherein the post is part of a plurality of posts that keep the plurality of snap dome switches from being used until the plurality of posts are withdrawn.

14. The system of claim 13, wherein at least some of the plurality of posts are moveable into a bottom of a housing so that the touch sensor remains stationary over an open space underneath the touch sensor and resting on the snap dome switches.

15. The system of claim 13, wherein at least one of the plurality of posts are retractable so that at least one of the snap domes switches is movable.

16. The system of claim 13, wherein when a downward force is applied on the touch sensor when the plurality of posts are retracted, the touch sensor gives tactile feedback.

17. The system of claim 13, wherein when a force is released on the touch sensor, at least one of the snap domes return the touch sensor to a rest position where no force is being applied.

18. The system of claim 11, further including a clicking element selectively held with the snap dome switch in a deformed position under tension.

* * * * *